United States Patent
Horng

(10) Patent No.: US 8,366,419 B2
(45) Date of Patent: Feb. 5, 2013

(54) INNER ROTOR TYPE MOTOR AND HEAT DISSIPATING FAN INCLUDING THE INNER ROTOR TYPE MOTOR

(75) Inventor: Alex Horng, Kaohsiung (TW)

(73) Assignee: Sunonwealth Electric Machine Industry Co., Ltd., Kaoshiung (TW)

( * ) Notice: Subject to any disclaimer, the term of this patent is extended or adjusted under 35 U.S.C. 154(b) by 277 days.

(21) Appl. No.: 12/554,953

(22) Filed: Sep. 7, 2009

(65) Prior Publication Data

US 2011/0058963 A1    Mar. 10, 2011

(51) Int. Cl.
*F04D 25/08* (2006.01)
*H02K 5/16* (2006.01)
*H02K 1/22* (2006.01)

(52) U.S. Cl. .......... 417/423.7; 417/423.1; 417/353; 310/67 R; 310/90

(58) Field of Classification Search .......... 417/353, 417/423.1, 423.7; 310/67 R, 156.26, 90, 310/266

See application file for complete search history.

(56) References Cited

U.S. PATENT DOCUMENTS

| | | | |
|---|---|---|---|
| 4,127,786 A | 11/1978 | Volkrodt | |
| 5,075,605 A | 12/1991 | Hendricks et al. | |
| 6,448,675 B1 * | 9/2002 | Horng et al. | 310/67 R |
| 6,774,520 B2 | 8/2004 | Wauke | |
| 2003/0090171 A1 * | 5/2003 | Horng et al. | 310/265 |
| 2005/0058559 A1 * | 3/2005 | Kasahara et al. | 417/423.7 |
| 2008/0130169 A1 * | 6/2008 | Kitamura | 360/99.08 |

FOREIGN PATENT DOCUMENTS

TW    200744290    1/2006

* cited by examiner

*Primary Examiner* — Devon Kramer
*Assistant Examiner* — Dominick L Plakkoottam
(74) *Attorney, Agent, or Firm* — Alan Kamrath; Kamrath IP Lawfirm, P.A.

(57) ABSTRACT

An inner rotor type motor includes a base having a pivotal portion. A stator is mounted to the base and includes a body and a coil unit engaged with the body and surrounding a hole of the body. A rotor includes a rotatable member, a shaft, and a permanent magnet. The rotatable member includes an engaging portion and a sidewall provided along a periphery of the engaging portion extending into the hole of the stator. The shaft includes an end coupled to the engaging portion. The other end of the shaft is coupled to the pivotal portion. The permanent magnet is mounted to an outer periphery of the rotatable member and aligned with the coil unit. The axial length of the shaft without the permanent magnet mounted thereto can be reduced, allowing reduction of axial heights of the motor and a heat dissipating fan utilizing the motor.

20 Claims, 10 Drawing Sheets

INNER ROTOR TYPE MOTOR AND HEAT DISSIPATING FAN INCLUDING THE INNER ROTOR TYPE MOTOR

BACKGROUND OF THE INVENTION

1. Field of the Invention

The present invention relates to a motor for a heat dissipating fan and, more particularly, to an inner rotor type motor for a heat dissipating fan. The present invention also relates to a heating dissipating fan including such an inner rotor type motor.

2. Description of the Related Art

FIG. 1 shows a conventional heat dissipating fan 7 including an outer rotor type motor. The heat dissipating fan 7 includes a housing 71, a stator 72, a circuit board 73, and a rotor 74. A shaft tube 711 is formed in the housing 71 and receives at least one bearing 712. The stator 72 and the circuit board 73 are mounted around the shaft tube 711 with the circuit board 73 electrically connected to the stator 72. The rotor 74 includes a shaft 741 and an impeller 742. An end of the shaft 741 is extended into the shaft tube 711 and rotatably held by the bearings 712. The impeller 742 is coupled to the other end of the shaft 741 and includes a permanent magnet 743 facing the stator 72. The circuit board 73 controls the stator 72 to generate an alternating flux, and, with the interaction of the alternating flux, the permanent magnet 743 will be driven to rotate. Thereby, the impeller 742 rotates for heat dissipation purposes.

Motors of the outer rotor type are generally less stable and have lower speed in rotation than motors of the inner rotor type. The current trend of research and development of electronic products includes high speed, function integrity, and miniaturization, which also have an increased need in heat dissipation. Unfortunately, the conventional heat dissipating fan 7 driven by an outer rotor type motor can not fulfill the heat dissipation need of these electronic products.

To meet higher heat dissipating needs, heat dissipating fans having inner rotor type rotors are utilized, and an example of which is disclosed in Taiwan Patent Publication No. 200744290 entitled "FAN AND ITS INNER ROTOR TYPE MOTOR." As illustrated in FIG. 2, the heat dissipating fan 8 includes a housing 81, a stator 82, a rotor 83, a driving device 84, and an impeller 85. The housing 81 is comprised of first and second housing parts 811 and 812 each receiving a bearing 813. The stator 82 includes a magnetically conductive member 821 to which the driving device 84 is electrically connected. The rotor 83 includes a shaft 831 and a magnetic element 832. The shaft 831 extends through the housing 81 and is rotatably held by the bearings 813. The magnetic element 832 is mounted around the shaft 831 and faces the magnetically conductive member 821. The impeller 85 couples to the shaft 831 and is arranged outside the housing 81. However, the shaft 831 of the heat dissipating fan 8 must include a portion L1 for mounting the magnetic element 832 and portions L2 and L3 for coupling with the first and second housing parts 811 and 812 and the bearings 813 for the purpose of stable rotation. Furthermore, the portion L1 must exceed a certain length to assure a sufficient area for magnetic interaction between the magnetic element 832 and the magnetically conductive member 821. Thus, it is difficult to reduce the length of the shaft 831, which limits reduction of the overall axial height of the inner rotor type motor and the heat dissipating fan 8 including the inner rotor type motor. Compact designs are, thus, not allowed.

FIG. 3 shows another conventional heat dissipating fan 9 driven by an inner rotor type motor 92. The heat dissipating fan 9 includes a housing 91, the inner rotor type motor 92, an impeller 93, and a circuit board 94. The housing 91 is integrally formed from plastic material by injection molding and includes a fan housing portion 911 and a motor casing 912. The motor casing 912 is located in the fan housing portion 911 and receives two bearings 913. The inner rotor type motor 92 is mounted in the motor casing 912 and includes a shaft 921, a magnetic element 922 and a stator 923. An end of the shaft 921 extends beyond the motor casing 912. The magnetic element 922 is mounted around the shaft 921 and faces the stator 923. The impeller 93 is coupled to the end of the shaft 921 and located in the motor casing 912. The circuit board 94 is electrically connected to the stator 923. The inner rotor type motor 92 drives the impeller 93 to rotate for heat dissipation purposes.

The heat dissipating fan 9 is advantageous over the heat dissipating fan 8 by the housing 91 that guides the air currents created by rotating the impeller 93. However, the shaft 921 of the heat dissipating fan 9 still has to include a portion L1 for mounting the magnetic element 922 and portions L2 and L3 for coupling with the motor casing 912 and the bearings 913 for the purpose of stable rotation. Likewise, it is difficult to reduce the length of the shaft 921, which limits reduction of the overall axial height of the inner rotor type motor 92 and the heat dissipating fan 9 including the inner rotor type motor 92.

SUMMARY OF THE INVENTION

An objective of the present invention is to provide an inner rotor type motor with reduced axial height and a heat dissipating fan including such a motor.

An inner rotor type motor according to the preferred teachings of the present invention includes a base having a pivotal portion. A stator is mounted to the base and includes a body and a coil unit. The body has a hole. The coil unit is engaged with the body and surrounds the hole. A rotor includes a rotatable member, a shaft, and a permanent magnet. The rotatable member includes an engaging portion and a sidewall provided along a periphery of the engaging portion. The sidewall extends into the hole of the stator. The shaft includes a first end coupled to the engaging portion of the rotatable member. The shaft further includes a second end coupled to the pivotal portion of the base. The permanent magnet is mounted to an outer periphery of the rotatable member and aligned with the coil unit.

In a first aspect, a heat dissipating fan according to the preferred teachings of the present invention includes a housing having an air inlet and an air outlet. A base is located in the housing and includes a pivotal portion. The base is interconnected by a plurality of connecting members to the housing. A stator is mounted to the base and includes a body and a coil unit. The body has a hole. The coil unit is engaged with the body and surrounds the hole. A rotor includes a rotatable member, a shaft, and a permanent magnet. The rotatable member includes an engaging portion and a sidewall provided along a periphery of the engaging portion. The sidewall extends into the hole of the stator. The shaft includes a first end coupled to the engaging portion of the rotatable member. The shaft further includes a second end coupled to the pivotal portion of the base. The permanent magnet is mounted to an outer periphery of the rotatable member and aligned with the coil unit. A plurality of blades is formed on the rotatable member of the rotor.

In a second aspect, a heat dissipating fan according to the preferred teachings of the present invention includes a base having a pivotal portion. A stator is mounted to the base and includes a body and a coil unit. The body has a hole. The coil unit is engaged with the body and surrounds the hole. A rotor includes a rotatable member, a shaft, and a permanent magnet. The rotatable member includes an engaging portion and a sidewall provided along a periphery of the engaging portion. The sidewall extends into the hole of the stator. The engaging portion has a through-hole. The shaft includes a first end engaged with the engaging portion of the rotatable member and extends beyond the rotatable member via the through-hole. The shaft further includes a second end coupled to the pivotal portion of the base. The permanent magnet is mounted to an outer periphery of the rotatable member and aligned with the coil unit. An impeller is mounted on the first end of the shaft beyond the rotatable member.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
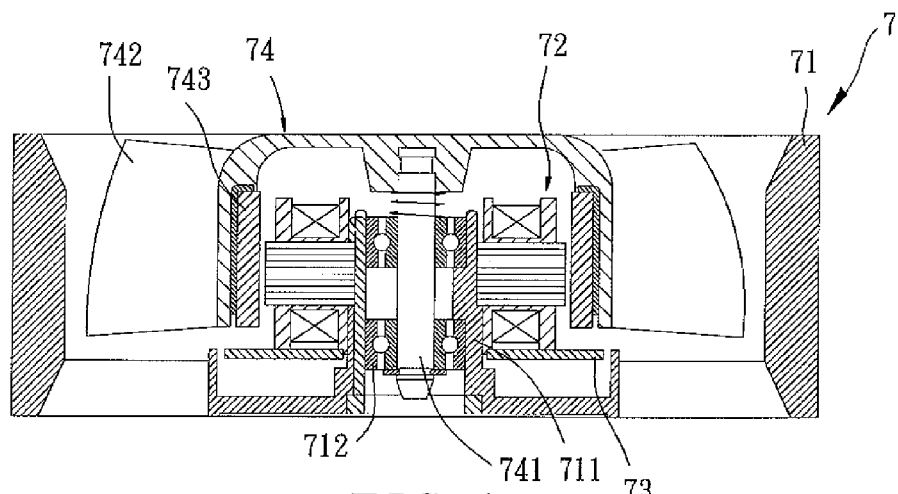
FIG. 1 shows a cross sectional view of a conventional heat dissipating fan having an outer rotor type motor.
Figure 2:
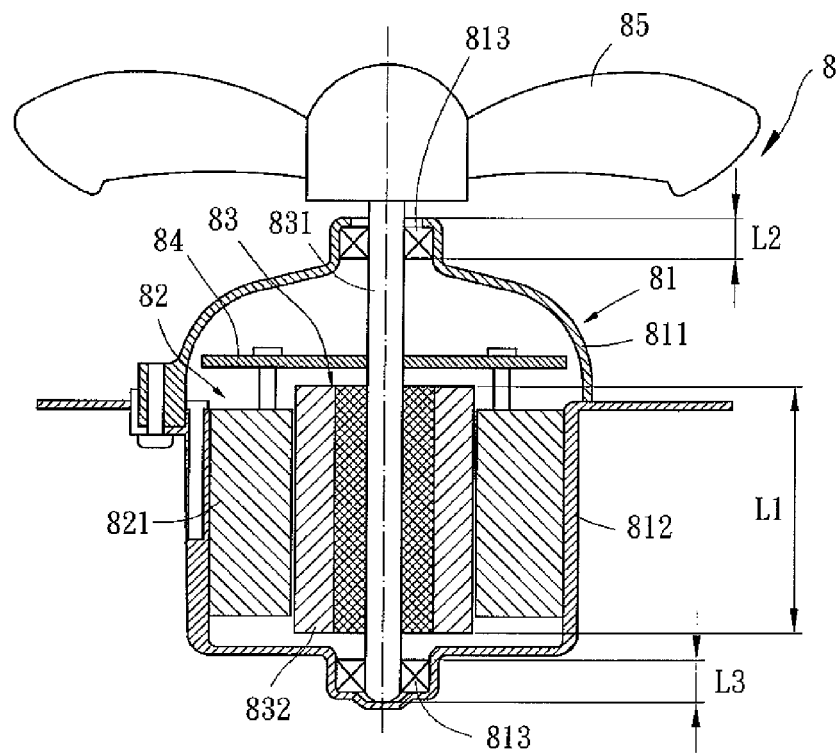
FIG. 2 shows a cross sectional view of a conventional heat dissipating fan having an inner rotor type motor.
Figure 3:
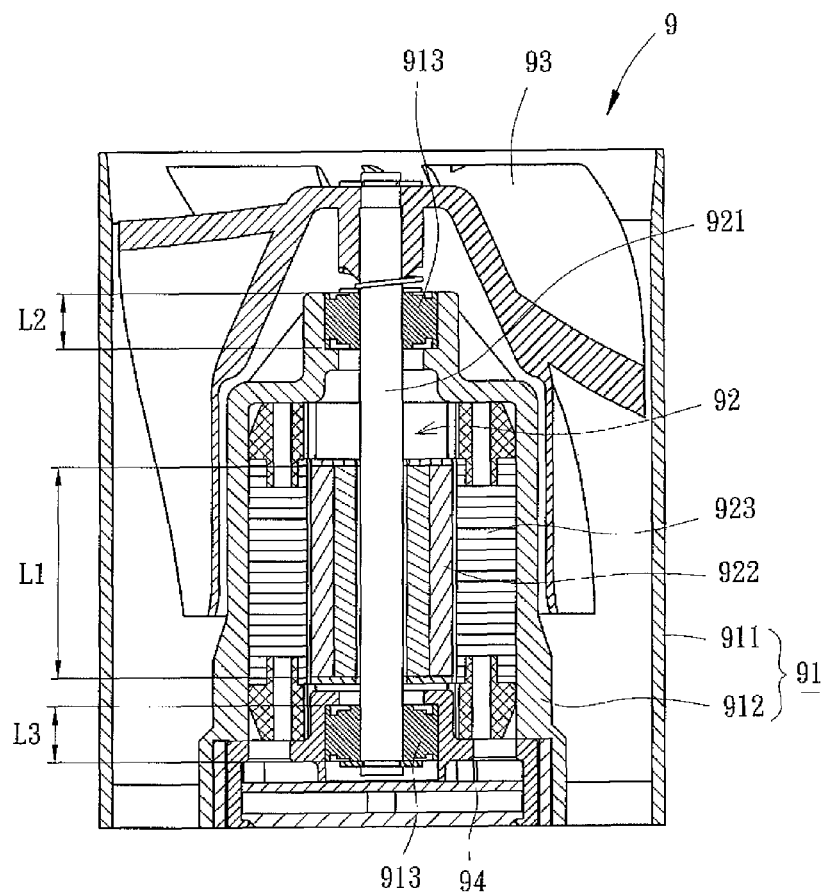
FIG. 3 shows a cross sectional view of another conventional heat dissipating fan having an inner rotor type motor.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "end", "portion", "axial", "radial", "annular", "outward", "inward", "spacing", "length", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 4:
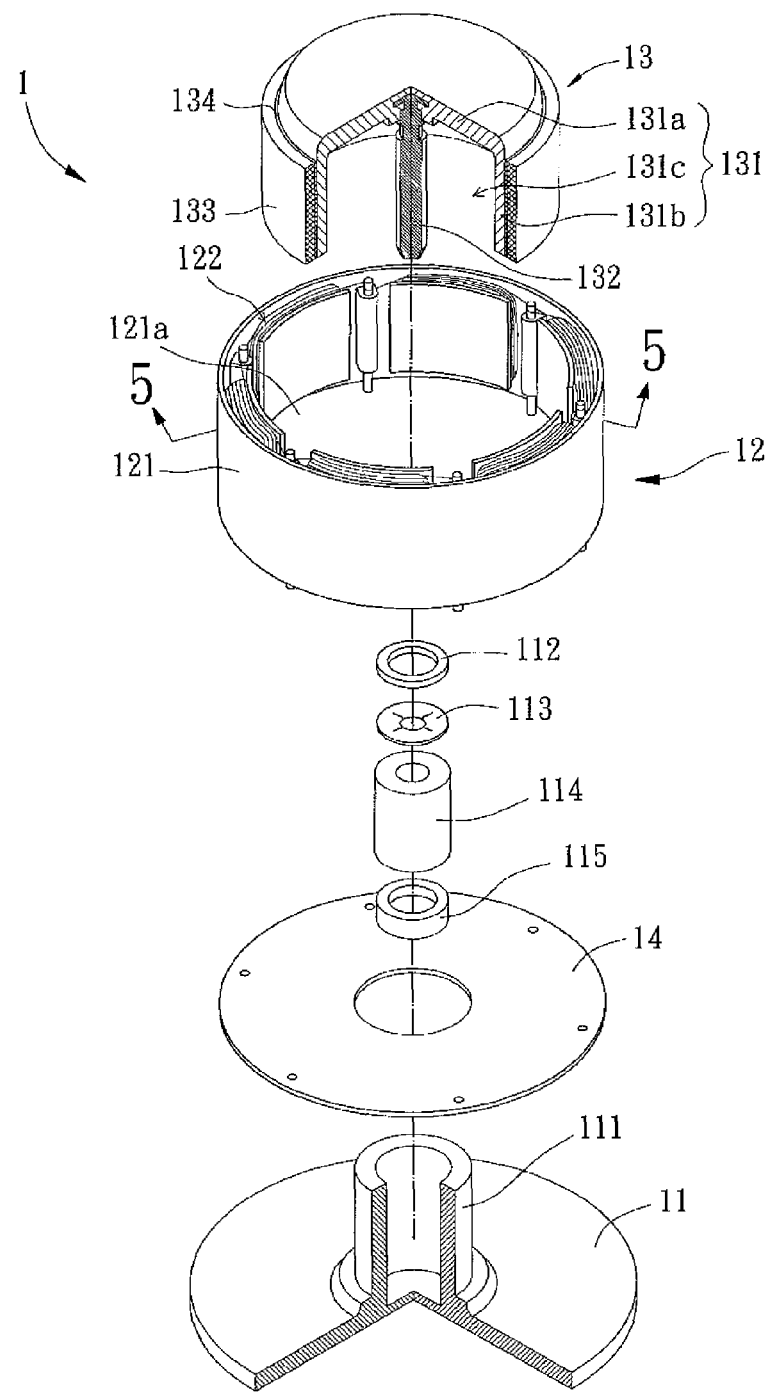
FIG. 4 shows an exploded, perspective view of an inner rotor type motor of a first embodiment according to the preferred teachings of the present invention with portions broken away.
Figure 5:
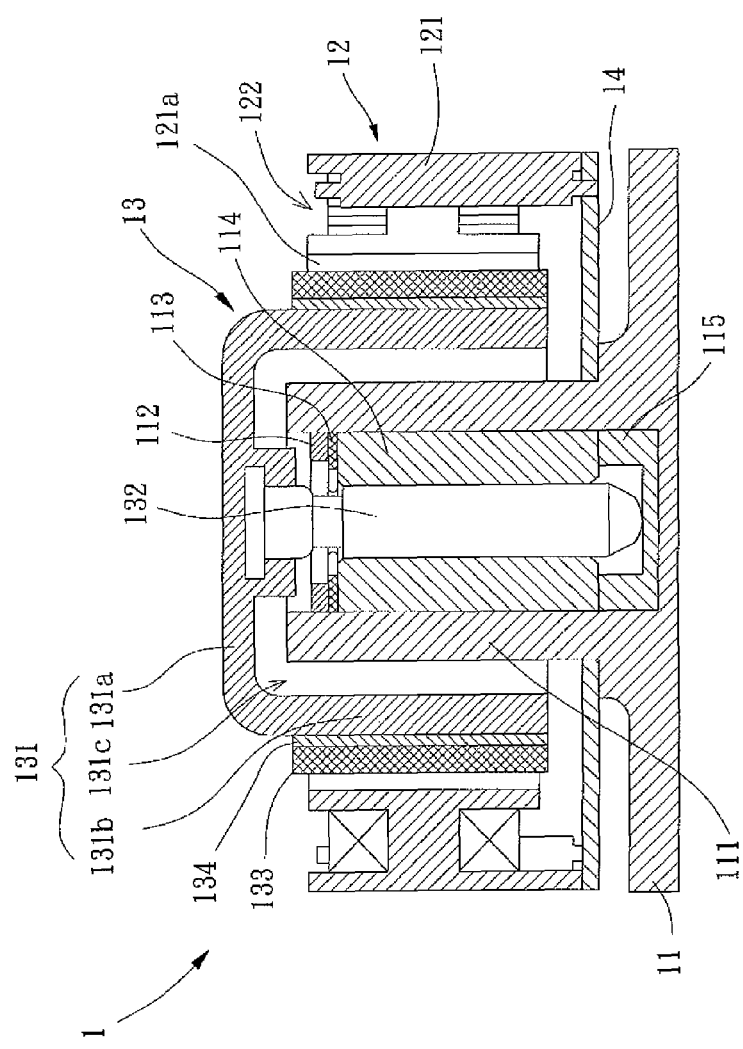
FIG. 5 shows a cross sectional view of the inner rotor type motor of FIG. 4 according to section line 5-5 of FIG. 4.

With reference to FIGS. 4 and 5, an inner rotor type of a first embodiment according to the preferred teachings of the present invention is designated 1 and generally includes a base 11, a stator 12 mounted to the base 11, and a rotor 13 rotatably coupled to the base 11. The stator 12 can drive the rotor 13 to rotate.

The base 11 includes a pivotal portion 111 in the form of a shaft seat, a shaft tube, or any mechanism for rotatably supporting the rotor 13. The pivotal portion 111 is in the form of a shaft tube in the preferred form shown in FIGS. 4 and 5. The shaft tube receives a fixing ring 112, a retaining plate 113, a bearing 114, and an abrasion-resistant plate 115. Thus, the rotor 13 can rotate smoothly due to the provision of the pivotal portion 111.

The stator 12 includes a body 121 and a coil unit 122. The body 121 includes a hole 121a. The coil unit 122 is engaged with the body 121 and surrounds the hole 121a. The coil unit 122 is mounted to an inner periphery of the body 121 in the preferred form shown in FIGS. 4 and 5. However, the coil unit 122 can be mounted to an outer periphery of the body 121.

The rotor 13 includes a rotatable member 131, a shaft 132, and a permanent magnet 133. The rotatable member 131 includes an engaging portion 131a and a sidewall 131b provided along a periphery of the engaging portion 131a. The sidewall 131b extends into the hole 121a of the stator 12. The sidewall 131b is preferably an annular wall to define a compartment 131c. The engaging portion 131a and the sidewall 131b can be integrally formed as a single continuous monolithic piece or separable from each other.

An end of the shaft 132 is engaged with the engaging portion 131a. In a case that the rotatable member 131 is formed from plastic material by injection molding, the end of the shaft 132 can be embedded in the engaging portion 131a. The other end of the shaft 132 is rotatably coupled to the pivotal portion 111 of the base 11. The pivotal portion 111 is preferably located in the compartment 131c to reduce the axial height of the inner rotor type motor 1.

The permanent magnet 133 is coupled to the outer periphery of the sidewall 131b of the rotatable member 131 by tight fitting, snapping, bonding, or other suitable provisions. The permanent magnet 133 is located in the hole 121a of the stator 12 and aligned with the coil unit 122. Preferably, a magnetically conducting ring 134 is mounted between the permanent magnet 133 and the sidewall 131b to provide a magnetically conducting effect for the permanent magnet 133.

In addition, preferably, the rotatable member 131 is made by injection molding, so as to receive the end of the shaft 132 engaged with the engaging portion 131a and couple with the permanent magnet 133 when the injection molding is processed. Accordingly, the rotor 13 can be easily formed with simple processes in manufacture.

In use of the inner rotor type motor 1 according to the preferred teachings of the present invention, the stator 12 is electrically connected to a drive circuit 14 that can be directly mounted on the base 11 (see FIG. 5). Alternatively, the stator 12 can be connected by wires to an external drive circuit 14 to avoid an increase in the axial height of the inner rotor type motor 1 due to mounting the drive circuit 14 on the base 11. The drive circuit 14 can activate the coil unit 122 of the stator 12 to generate an alternating flux interacting with the permanent magnet 133, driving the rotor 13 to rotate about an axis defined by the pivotal portion 111 of the base 11.

It can be appreciated that the permanent magnet 133 is mounted to the sidewall 131b of the rotatable member 131 instead of the shaft 132. The length of the shaft 132 along the axis can be reduced, allowing reduction of the overall axial height and allowing compact designs of the inner rotor type motor 1. The disadvantages of the conventional heat dissipating fans 8 and 9 resulting from difficulties in reduction of the length of the shaft 831, 921 are, thus, avoided.

Figure 6:
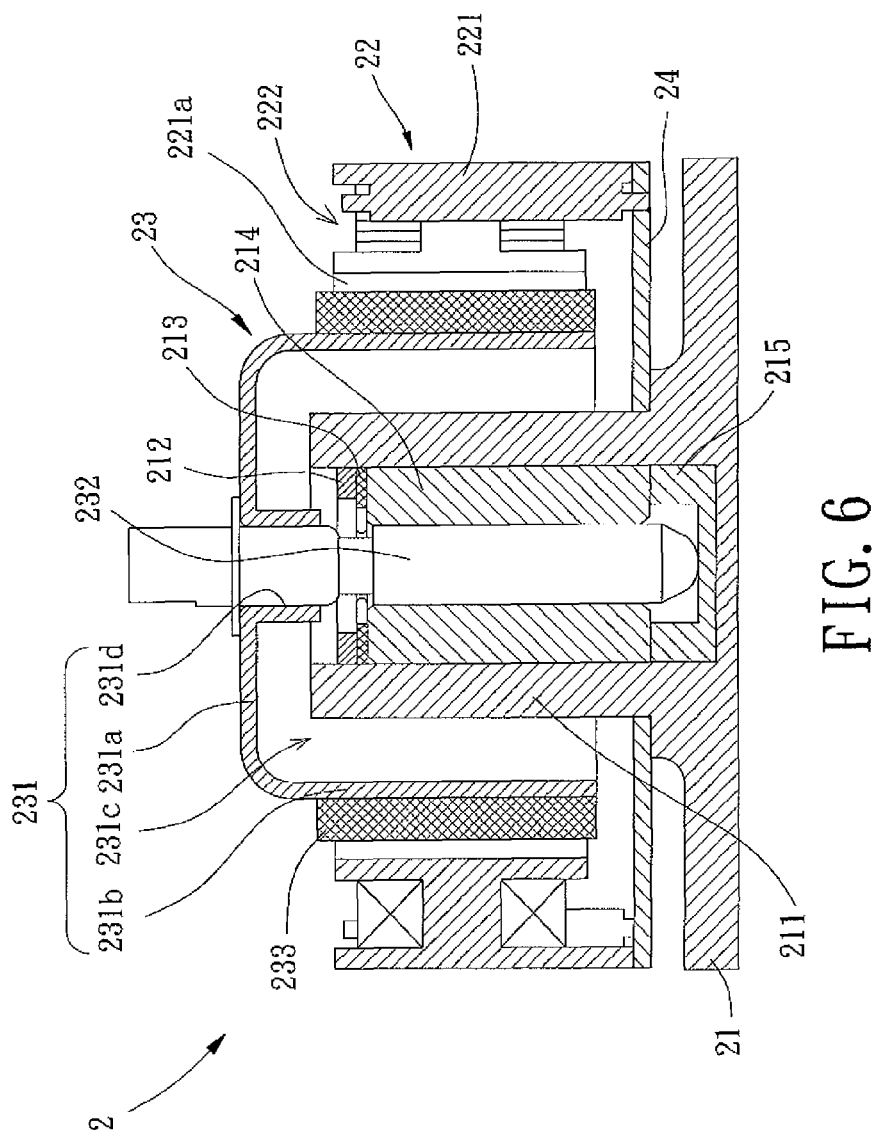
FIG. 6 shows a cross sectional view of an inner rotor type motor of a second embodiment according to the preferred teachings of the present invention.

With reference to FIG. 6, an inner rotor type motor of a second embodiment according to the preferred teachings of the present invention is designated 2 and includes a base 21, a stator 22, and a rotor 23. The base 21 and the stator 22 are substantially the same as the base 11 and the stator 12 of the first embodiment and therefore not described in detail to avoid redundancy. In brief, the base 21 includes a pivotal portion 211, a fixing ring 212, a retaining plate 213, a bearing 214, and an abrasion-resistant plate 215. The stator 22 includes a body 221, a hole 221a, and a coil unit 222 and is electrically connected to a drive circuit 24.

The rotor 23 of the second embodiment includes a rotatable member 231, a shaft 232, and a permanent magnet 233. The rotatable member 231 is a metal cap in the preferred form shown in FIG. 6 and includes an engaging portion 231a and a sidewall 231b provided along a periphery of the engaging portion 231a. The sidewall 231b extends into the hole 221a of the stator 22. The sidewall 231b is preferably an annular wall to define a compartment 231c. The engaging portion 231a includes a through-hole 231d. An end of the shaft 232 is engaged with the engaging portion 231a and has an end portion extending beyond the rotatable member 231 via the through-hole 231d and retained in place by a retainer such as a C-clip. The other end of the shaft 232 is rotatably coupled to the pivotal portion 211 of the base 21. The pivotal portion 211 is preferably located in the compartment 231c. The permanent magnet 233 is coupled to the outer periphery of the sidewall 231b of the rotatable member 231. The permanent magnet 233 is located in the hole 221a of the stator 22 and aligned with the coil unit 222.

It can be appreciated that the permanent magnet 233 is mounted to the sidewall 231b of the rotatable member 231 to allow reduction of the overall axial height of the inner rotor type motor 2. Furthermore, since the rotatable member 231 is a metal cap that magnetically conducts the permanent magnet 233, the magnetically conducting ring 134 of the first embodiment can be omitted to save costs and to reduce structural complexity. Furthermore, an impeller can be coupled to the end of the shaft 232 extending beyond the rotatable member 231 via the through-hole 231d, enhancing utility and assembling convenience.

Figure 7:
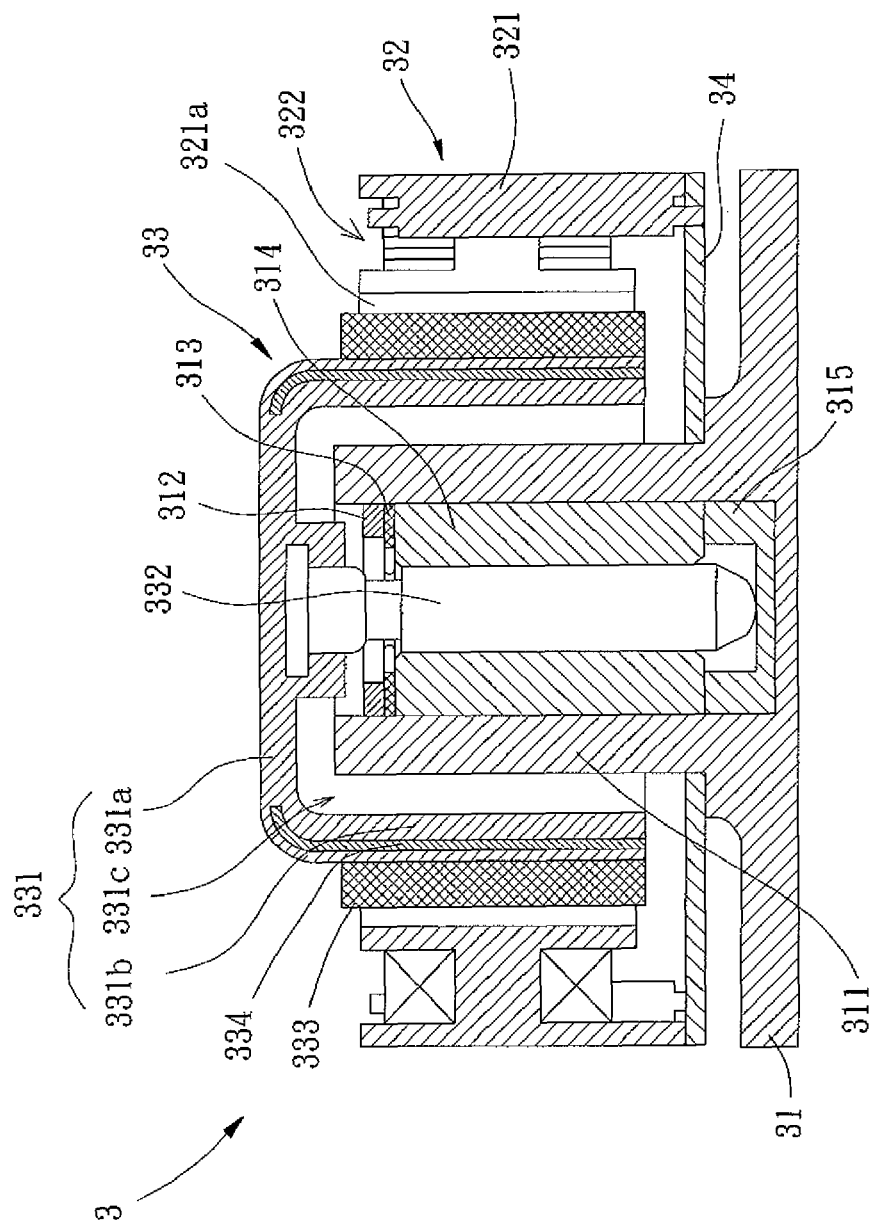
FIG. 7 shows a cross sectional view of an inner rotor type motor of a third embodiment according to the preferred teachings of the present invention.

With reference to FIG. 7, an inner rotor type motor of a third embodiment according to the preferred teachings of the present invention is designated 3 and includes a base 31, a stator 32, and a rotor 33. The base 31 and the stator 32 are substantially the same as the base 11 and the stator 12 of the first embodiment and therefore not described in detail to avoid redundancy. In brief, the base 31 includes a pivotal portion 311, a fixing ring 312, a retaining plate 313, a bearing 314, and an abrasion-resistant plate 315. The stator 32 includes a body 321, a hole 321a, and a coil unit 322 and is electrically connected to a drive circuit 34.

The rotor 33 of the third embodiment includes a rotatable member 331, a shaft 332, and a permanent magnet 333. The rotatable member 331 includes an engaging portion 331a and a sidewall 331b provided along a periphery of the engaging portion 331a. The sidewall 331b extends into the hole 321a of the stator 32. The sidewall 331b is preferably an annular wall to define a compartment 331c. An end of the shaft 332 is engaged with the engaging portion 331a of the rotatable member 331. The other end of the shaft 332 is rotatably coupled to the pivotal portion 311 of the base 31. The pivotal portion 311 is preferably located in the compartment 331c. The permanent magnet 333 is coupled to the outer periphery of the sidewall 331b of the rotatable member 331. The permanent magnet 333 is located in the hole 321a of the stator 32 and aligned with the coil unit 322. The rotor 33 can further include a magnetically conducting ring 334. In a case that the rotatable member 331 is formed from plastic material by injection molding, the magnetically conducting ring 334 is embedded in the sidewall 331b to provide a magnetically conducting effect for the permanent magnet 333.

Figure 8:
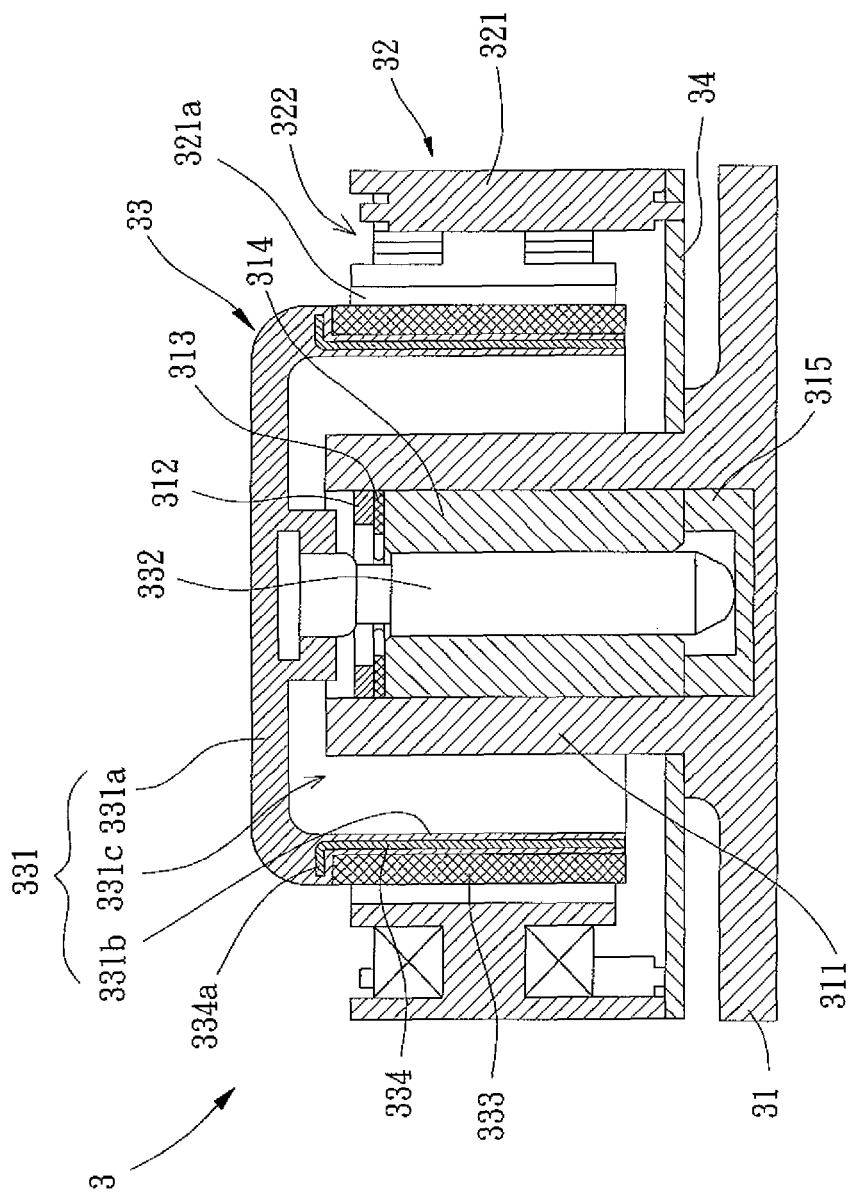
FIG. 8 shows a cross sectional view of an inner rotor type motor of a modified embodiment according to the preferred teachings of the present invention.

It can be appreciated that the permanent magnet 333 is mounted to the sidewall 331b of the rotatable member 331 to allow reduction of the overall axial height of the inner rotor type motor 3. The magnetically conducting ring 334 is embedded in the sidewall 33 1b of the rotatable member 331 to avoid disengagement of the magnetically conducting ring 334 and to increase rotational stability. In a modified embodiment shown in FIG. 8, an end of the magnetically conducting ring 334 adjacent engaging portion 331a includes an extension 334a with a predetermined length and extending toward the stator 32 in a radial direction perpendicular to the axis. Thus, the magnetically conducting ring 334 can cover a larger area of the permanent magnet 333 to provide an enhanced magnetically conducting effect.

Figure 9:
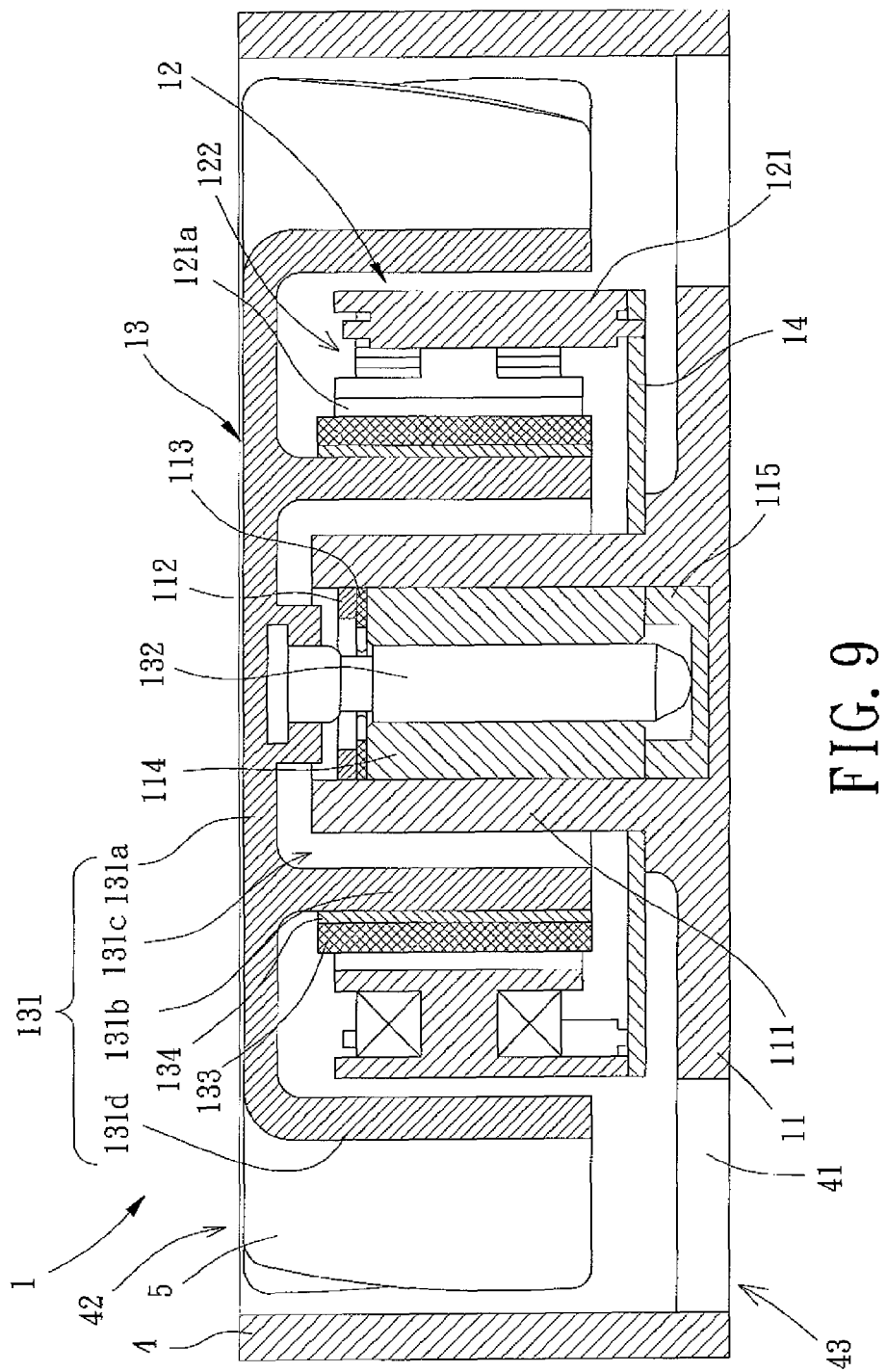
FIG. 9 shows a cross sectional view of a heat dissipating fan including an inner rotor type motor according to the preferred teachings of the present invention.

The inner rotor type motors 1, 2, and 3 according to the preferred teachings of the present invention can be utilized in various heat dissipating modules. In an example shown in FIG. 9 utilizing the inner rotor type motor 1, the base 11 is interconnected by a plurality of connecting members 41 in the form of ribs or static vanes to a housing 4 with the base 11 located in the housing 4. The housing 4 includes an air inlet 42 and an air outlet 43. The rotatable member 131 of the rotor 13 can include a plurality of blades 5 extending toward the housing 4 in the radial direction. In the preferred form shown in FIG. 9, the rotatable member 131 includes an annular wall 131d radially outward of the sidewall 131b, with the blades 5 formed on the outer periphery of the annular wall 131d and with the stator 12 located between the annular wall 131d and the sidewall 131b. The heat dissipating fan can be mounted in any electronic device or equipment. When the rotor 13 rotates, air currents are driven in by the blades 5 via the air inlet 42 and out through the air outlet 43 to a heat source for heat dissipating purposes. It can be appreciated that the inner rotor type motors 2 and 3 of the second and third embodiments according to the preferred teachings of the present invention can be utilized in heat dissipating fans similar to that shown in FIG. 9 according to the teachings of the present invention.

Figure 10:
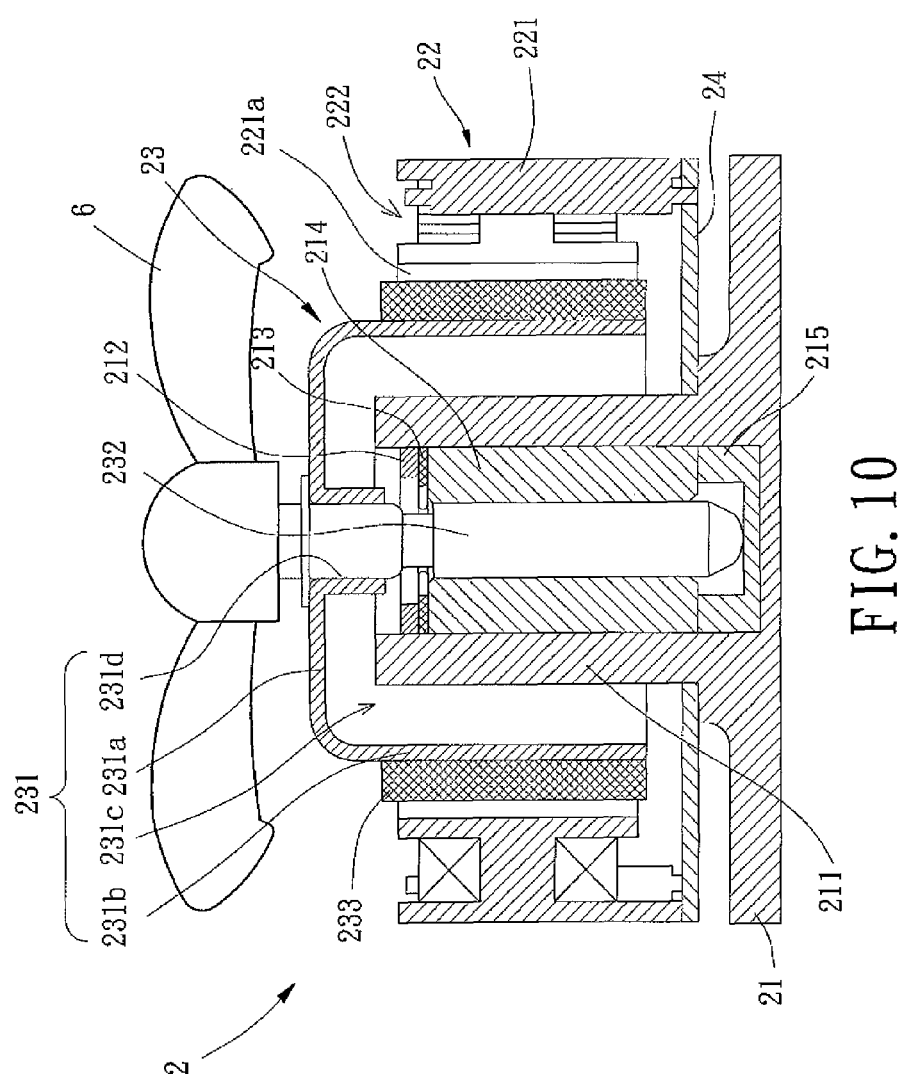
FIG. 10 shows a cross sectional view of another heat dissipating fan including an inner rotor type motor according to the preferred teachings of the present invention.
Figure 11:
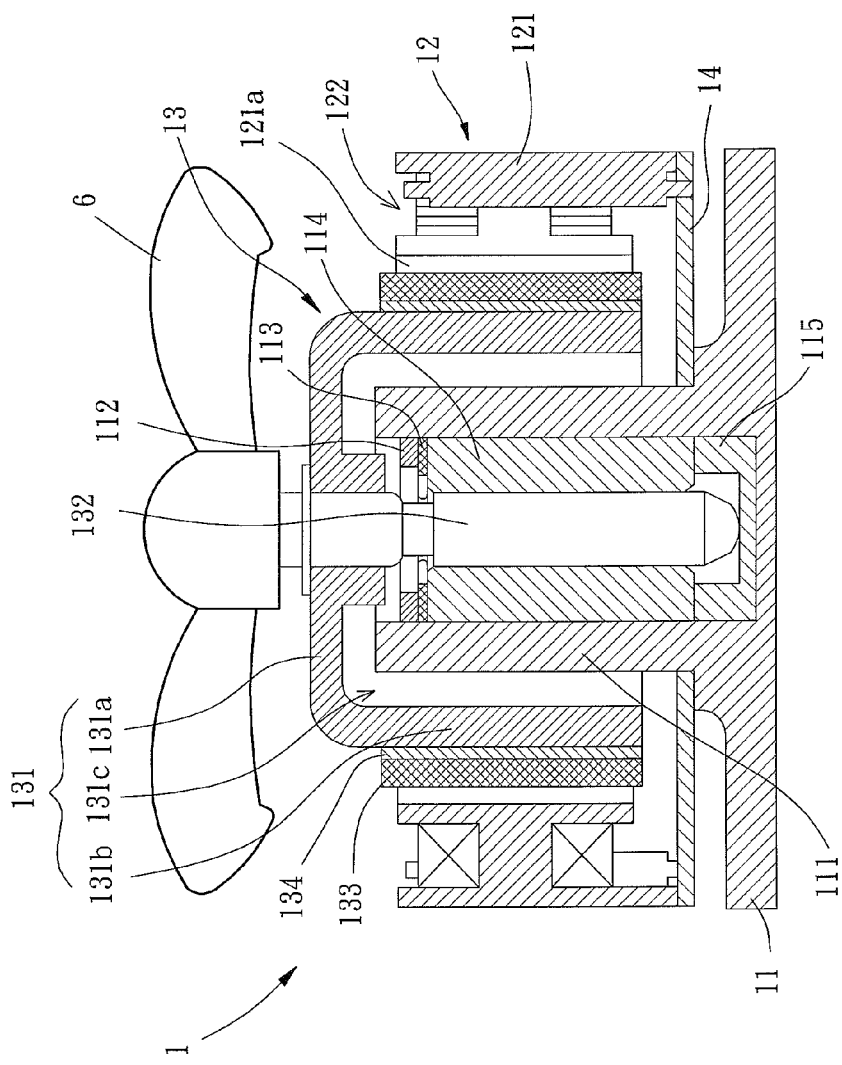
FIG. 11 shows a cross sectional view of another heat dissipating fan including an inner rotor type motor according to the preferred teachings of the present invention.

In another example shown in FIG. 10 utilizing the inner rotor type motor 2 according to the preferred teachings of the present invention, an impeller 6 is coupled to the end of the shaft 232 extending beyond the rotatable member 231 via the through-hole 231d. The heat dissipating fan can be mounted in any electronic device or equipment. When the rotor 23 rotates, the impeller 6 drives air currents for heat dissipating purposes. It can be appreciated that the inner rotor type motors 1 and 3 of the first and third embodiments according to the preferred teachings of the present invention can be utilized in heat dissipating fans similar to that shown in FIG. 10 according to the teachings of the present invention, such as shown in FIG. 11 for example.

Overall, by mounting the permanent magnet 133, 233, 333 on the sidewall 131b, 231b, 331b of the rotatable member 131, 231, 331, the shaft 132, 232, 332 does not extend through and couple with the permanent magnet 133, 233, 333, and the length of the shaft 132, 232, 332 can be reduced. Accordingly, reduction in the overall axial heights of the inner rotor type motor 1, 2, 3 and the heat dissipating fan including the inner rotor type motor 1, 2, 3 according to the preferred teachings of the present invention is achieved.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An inner rotor type motor comprising, in combination:
    a base including a pivotal portion;
    a stator mounted to the base and including a body and a coil unit, with the body including a hole, with the coil unit engaged with the body and surrounding the hole; and
    a rotor including a rotatable member, a shaft, a permanent magnet and a magnetically conducting ring, with the rotatable member including an engaging portion and a cylindrical sidewall provided along a periphery of the engaging portion, with the cylindrical sidewall extending into the hole of the stator, with the shaft including a first end coupled to the engaging portion of the rotatable member, with the shaft further including a second end coupled to the pivotal portion of the base, with the cylindrical sidewall having a first axial end connected to the engaging portion and a second axial end spaced from the first axial end parallel to the shaft, with the cylindrical sidewall having an outer periphery and an inner periphery extending between the first and second axial ends, wherein the inner periphery is opposite to the outer periphery of the cylindrical sidewall, with the permanent magnet mounted to the outer periphery of the cylindrical sidewall that extends between the first and second axial ends of the cylindrical sidewall of the rotatable member and aligned with the coil unit, and with the magnetically conducting ring intermediate the permanent magnet and the inner periphery of the cylindrical sidewall and aligned with the coil unit.

2. The inner rotor type motor as claimed in claim 1, with the magnetically conducting ring mounted between the permanent magnet and the cylindrical sidewall of the rotatable member.

3. The inner rotor type motor as claimed in claim 1, with the rotatable member being a metal cap magnetically conducting the permanent magnet.

4. The inner rotor type motor as claimed in claim 1, with the magnetically conducting ring embedded in the cylindrical sidewall of the rotatable member.

5. The inner rotor type motor as claimed in claim 4, with the magnetically conducting ring including an end adjacent the engaging portion, with the end of the magnetically conducting ring including an extension with a predetermined length and extending toward the stator in a radial direction perpendicular to an axis about which the shaft is rotatable.

6. The inner rotor type motor as claimed in claim 1, with the cylindrical sidewall of the rotatable member being an annular wall defining a compartment, and with the pivotal portion of the base located in the compartment.

7. The inner rotor type motor as claimed in claim 1, with the engaging portion of the rotatable member including a through-hole, and with the first end of the shaft extending beyond the rotatable member via the through-hole.

8. A heat dissipating fan comprising, in combination:
    a housing including an air inlet and an air outlet;
    a base located in the housing and including a pivotal portion, with the base interconnected by a plurality of connecting members to the housing;
    a stator mounted to the base and including a body and a coil unit, with the body including a hole, with the coil unit engaged with the body and surrounding the hole; and
    a rotor including a rotatable member, a shaft, a permanent magnet and a magnetically conducting ring, with the rotatable member including an engaging portion and a cylindrical sidewall provided along a periphery of the engaging portion, with the cylindrical sidewall extending into the hole of the stator, with the shaft including a first end coupled to the engaging portion of the rotatable member, with the shaft further including a second end coupled to the pivotal portion of the base, with the cylindrical sidewall having a first axial end connected to the engaging portion and a second axial end spaced from the first axial end parallel to the shaft, with the cylindrical sidewall having an outer periphery and an inner periphery extending between the first and second axial ends, wherein the inner periphery is opposite to the outer periphery of the cylindrical sidewall, with the permanent magnet mounted to the outer periphery of the cylindrical sidewall that extends between the first and second axial ends of the cylindrical sidewall of the rotatable member and aligned with the coil unit, with a plurality of blades formed on the rotatable member of the rotor, and with the magnetically conducting ring intermediate the permanent magnet and the inner periphery of the rotatable member and aligned with the coil unit.

9. The heat dissipating fan as claimed in claim 8, with the magnetically conducting ring mounted between the permanent magnet and the cylindrical sidewall of the rotatable member.

10. The heat dissipating fan as claimed in claim 8, with the rotatable member being a metal cap magnetically conducting the permanent magnet.

11. The heat dissipating fan as claimed in claim 8, with the magnetically conducting ring embedded in the cylindrical sidewall of the rotatable member.

12. The heat dissipating fan as claimed in claim 11, with the magnetically conducting ring including an end adjacent the engaging portion, with the end of the magnetically conducting ring including an extension with a predetermined length and extending toward the stator in a radial direction perpendicular to an axis about which the shaft is rotatable.

13. The heat dissipating fan as claimed in claim 8, with the cylindrical sidewall of the rotatable member being an annular wall defining a compartment, and with the pivotal portion of the base located in the compartment.

14. The heat dissipating fan as claimed in claim 8, with the rotatable member of the rotor including an annular wall radially outward of the cylindrical sidewall, and with the plurality of blades formed on an outer periphery of the annular wall.

15. A heat dissipating fan comprising, in combination:
    a base including a pivotal portion;
    a stator mounted to the base and including a body and a coil unit, with the body including a hole, with the coil unit engaged with the body and surrounding the hole;
    a rotor including a rotatable member, a shaft, a permanent magnet and a magnetically conducting ring, with the rotatable member including an engaging portion and a cylindrical sidewall provided along a periphery of the engaging portion, with the cylindrical sidewall extending into the hole of the stator, with the engaging portion having a through-hole, with the shaft including a first end engaged with the engaging portion of the rotatable member and extending beyond the rotatable member via the throughhole, with the shaft further including a second end coupled to the pivotal portion of the base, with the cylindrical sidewall having a first axial end connected to the engaging portion and a second axial end spaced from the first axial end parallel to the shaft, with the cylindrical sidewall having an outer periphery and an inner periphery extending between the first and second axial ends, wherein the inner periphery is opposite to the outer periphery of the cylindrical sidewall, with the permanent magnet mounted to the outer periphery of the cylindrical sidewall that extends between the first and second axial ends of the cylindrical sidewall of the rotatable member and aligned with the coil unit, and with the magnetically conducting ring intermediate the permanent magnet and an inner periphery of the rotatable member and aligned with the coil unit; and an impeller mounted on the first end of the shaft beyond the rotatable member.

16. The heat dissipating fan as claimed in claim 15, with the magnetically conducting ring mounted between the permanent magnet and the cylindrical sidewall of the rotatable member.

17. The heat dissipating fan as claimed in claim 15, with the rotatable member being a metal cap magnetically conducting the permanent magnet.

18. The heat dissipating fan as claimed in claim 15, with the magnetically conducting ring embedded in the cylindrical sidewall of the rotatable member.

19. The heat dissipating fan as claimed in claim 18, with the magnetically conducting ring including an end adjacent the engaging portion, with the end of the magnetically conducting ring including an extension with a predetermined length and extending toward the stator in a radial direction perpendicular to an axis about which the shaft is rotatable.

20. The heat dissipating fan as claimed in claim 15, with the cylindrical sidewall of the rotatable member being an annular wall defining a compartment, and with the pivotal portion of the base located in the compartment.

* * * * *